(12) United States Patent
Lindgren et al.

(10) Patent No.: US 6,545,612 B1
(45) Date of Patent: Apr. 8, 2003

(54) APPARATUS AND METHOD OF DETECTING PROXIMITY INDUCTIVELY

(75) Inventors: Ulf Lindgren, Lund (SE); Christian Björk, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 109 days.

(21) Appl. No.: 09/597,303

(22) Filed: Jun. 20, 2000

(30) Foreign Application Priority Data

Jun. 21, 1999 (SE) .............................................. 9902362

(51) Int. Cl.[7] .............................................. G08B 21/00
(52) U.S. Cl. ...................... 340/686.6; 381/59; 455/550; 455/575
(58) Field of Search ........................ 340/686.1, 686.6; 455/90, 550, 575; 381/59, 98

(56) References Cited

U.S. PATENT DOCUMENTS

| | | |
|---|---|---|
| 4,219,740 A | 8/1980 | Little |
| 4,613,830 A | 9/1986 | Kamiya et al. |
| 5,337,353 A | 8/1994 | Boie et al. |
| 5,418,860 A | 5/1995 | Daniels |
| 5,760,688 A | 6/1998 | Kasai |

FOREIGN PATENT DOCUMENTS

| | | |
|---|---|---|
| EP | 0 827 287 | 3/1998 |
| GB | 2 011 086 | 7/1979 |

OTHER PUBLICATIONS

PCT International—Type Search Report dated Jun. 7, 2000.

*Primary Examiner*—Daniel J. Wu
(74) *Attorney, Agent, or Firm*—Burns, Doane, Swecker & Mathis, L.L.P.

(57) ABSTRACT

An electronic communications device having a proximity sensor comprising: communication means (7) and a proximity sensor adapted to provide a control signal (Y2; Y3; Y4) indicative of whether an object (8) is in proximity of the device. The device is characterized by having a proximity sensor coil (L1; L2; L3; L5; L6; LP; LL) with an impedance, and oscillation means (C1, C2, 302; 601; 804) coupled to the proximity sensor coil (L1; L2; L3; L5; L6; LP; LL) to provide the control signal (Y2; Y3; Y4) in response to the impedance.

In a preferred embodiment the proximity sensor coil is a loudspeaker coil. The invention also relates to a method of detecting proximity of an object relative to a loudspeaker (11; 703; 803) with a loudspeaker coil (L5; L6) which has an impedance.

17 Claims, 5 Drawing Sheets

APPARATUS AND METHOD OF DETECTING PROXIMITY INDUCTIVELY

This application claims priority under 35 U.S.C. §§119 and/or 365 to 9902362-4 filed in Sweden on Jun. 21, 1999; the entire content of which is hereby incorporated by reference.

BACKGROUND OF THE INVENTION

1. Field of the Invention

This invention relates to an electronic device having a proximity sensor, comprising: a loudspeaker for receiving an audio signal and having a loudspeaker coil with an impedance; a proximity sensor adapted to provide a control signal indicative of whether an object is in the proximity of the device.

This invention also relates to an electronic communications device having a proximity sensor comprising: communication means, and a proximity sensor adapted to provide a control signal indicative of whether an object is in the proximity of the device.

Moreover, this invention relates to a method of detecting proximity of an object relative to a loudspeaker with a loudspeaker coil which has an impedance.

2. Description of the Related Art

U.S. Pat. No. 4,613,830 discloses a proximity switch which includes an oscillation circuit whose oscillation output is variable depending on the inductance of a coil. An object in the proximity of the coil can be detected by observing a decline in the oscillation output. For the purpose of increasing the recovery speed of the oscillation which has dropped as a result of detecting a approaching object, a certain signal is applied to the oscillation circuit to increase its oscillation gain.

U.S. Pat. No. 5,337,535 discloses a capacitive proximity sensor for use e.g. in a telephone handset to sense whether an object e.g. a user, a table, or another object is in the proximity of the telephone handset. The disclosed proximity sensors include a sensing electrode mounted in parallel to a guard electrode; the electrodes are separated by an insulating layer. The sensing electrode and the guard electrode are driven in unison by an RF signal. The proximity of an object to the sensor is detected by monitoring the RF current flowing through the sensing electrode by means of a bridge coupling.

However, the above cited prior art requires unnecessarily many components for proximity detection, which reduce battery operating time and which require additional space in small-sized products (e.g. a mobile phone). Further, the manufacturing expenses and the risk of break-down of the product due to component failures are increased.

BRIEF SUMMARY OF THE INVENTION

An object of the invention is therefore to reduce the number of components in small-sized products having proximity detection. It is a further object of the invention to increase battery operating time.

This is achieved when the electronic device mentioned in the opening paragraph is characterized by having oscillation means coupled to the loudspeaker coil and to provide the control signal in response to the impedance.

Consequently, the loudspeaker coil is used to sense proximity. When an object moves closer to the device (i.e. the loudspeaker coil), the object will tend to concentrate the magnetic flux density; and when the object moves farther away, it will separate the lines of flux cutting across the sensing element (i.e. the loudspeaker coil). The electromagnetic properties of the object are thus used to modulate the inductance of the loudspeaker coil used as a sensing element. Further, no additional components are needed for proximity detection, which in turn increases the reliability of the device while battery operating power may be conserved.

The prior art further involves the problem that when it is the purpose to decide whether an object is in the proximity of e.g. a mobile telephone, it is almost impossible to provide a well-defined proximity zone; and thereby almost impossible to decide when to execute a proximity triggered function. More specifically, a capacitive proximity sensor is very sensitive to varying electrical properties of possible objects and in particular sensitive to electronic charge (static charge) of possible objects. That is, even a change in humidity may result in an excessive change of the impedance of the capacitive element. Thus capacitive proximity sensors are very unreliable.

It is therefore another object of the invention to provide reliable decisions of whether an object is present or not.

This is achieved when the electronic communications device mentioned in the opening paragraph is characterized by having a proximity sensor coil with an impedance, and oscillation means coupled to the proximity sensor coil to provide the control signal in response to the impedance.

Consequently, it is possible to determine whether an object is present in the proximity of the coil in a way which is less sensitive to parameters uncontrollable in this respect such as humidity, static charge of the object, etc.

BRIEF DESCRIPTION OF THE SEVERAL VIEWS OF THE DRAWINGS

The invention will be explained more fully below in connection with a preferred embodiment and with reference to the drawing, in which.

DETAILED DESCRIPTION OF THE INVENTION

Figure 1:
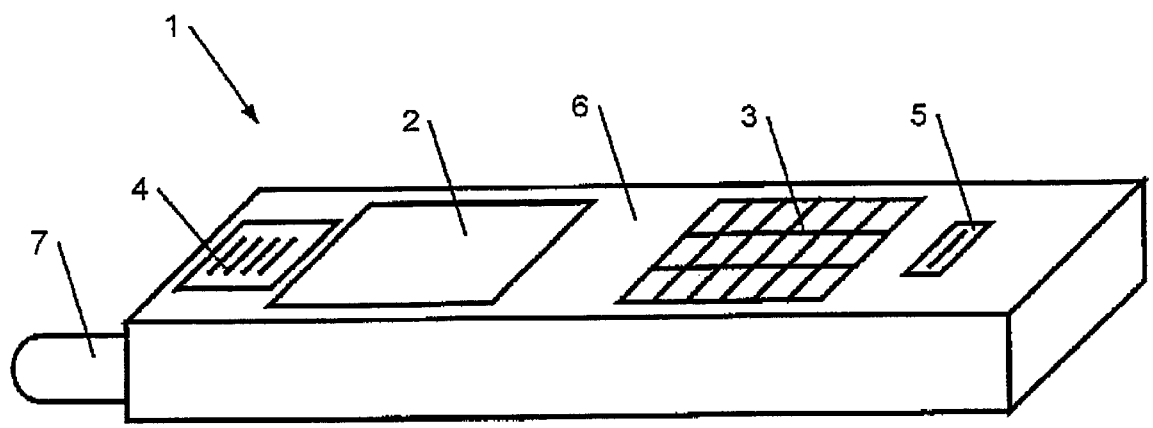
FIG. 1 shows an electronic device with a proximity sensor according to the invention.

FIG. 1 shows an electronic device with a proximity sensor according to the invention. A mobile communications device 1 comprises a display 2 and a keypad 3 for operating the mobile communications device. A front cover 6 is adapted to provide access to the display, the keypad, and a loudspeaker (not shown) and a microphone (not shown). The front cover 6 comprises openings 4 and 5 for transmission of sound to/from the loudspeaker and microphone, respectively.

In order to provide wireless communication the mobile communications device comprises an antenna 7.

Figure 2:
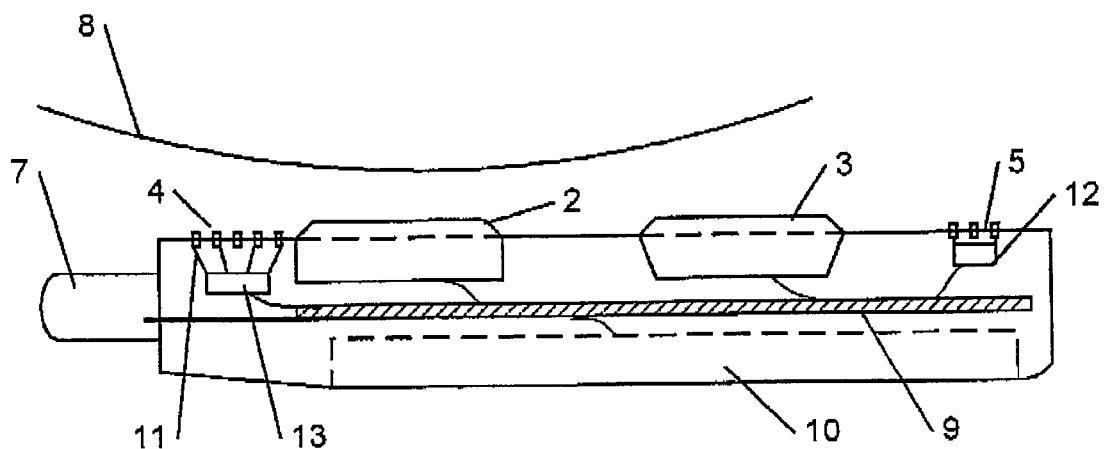
FIG. 2 shows a cross-sectional view through an electronic device with a proximity sensor according to the invention.

FIG. 2 shows a cross-sectional view through an electronic device with a proximity sensor according to the invention. The display 2, the keypad 3, a loudspeaker 11, a microphone 12, and the antenna 7 are connected to a printed circuit board (PCB) 9. The device can be operated by battery power supplied by a battery 10.

The loudspeaker 11 comprises a coil 13 connected to an audio circuit (not shown) on the PCB to generate a magnetic field capable of moving a loudspeaker membrane (not shown) in response to an audio signal.

A proximity sensor according to the invention can be adapted to detect whether an object 8 is present in the proximity of the device 1. A proximity sensor according to the invention is based on the principle that when the object 8 moves closer to the device the object will tend to concentrate the magnetic flux density; and when the object moves farther away it will separate the lines of flux cutting across the sensing element in the form of a coil. The electromagnetic properties of the object are thus used to modulate the inductance of a coil used as a sensing element. The coil can be a coil specifically adapted as a proximity sensor, the coil can be integrated in a loudspeaker assembly, and the coil can be adapted both to drive a loudspeaker and to sense proximity.

Figure 3:
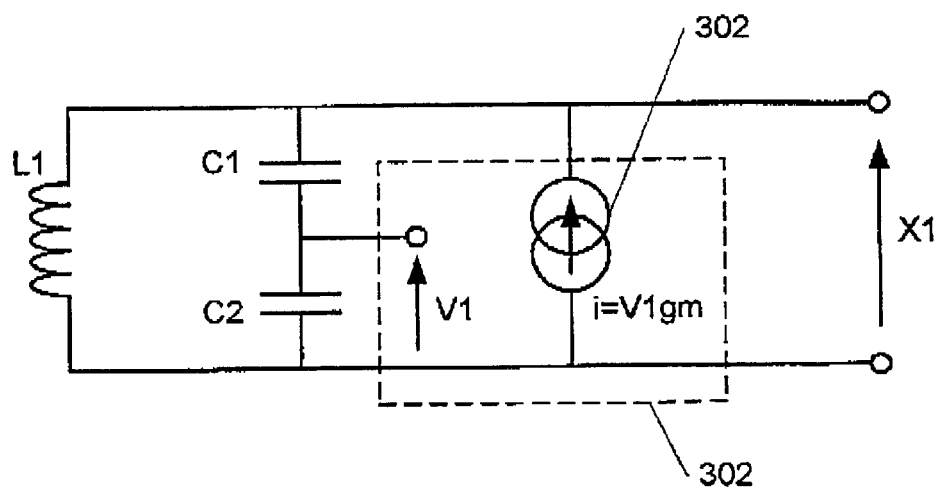
FIG. 3 shows a simple model of an oscillator.

FIG. 3 shows a simple model of an oscillator. Basically, an inductive element, a capacitive element, and an active element connected to form an oscillator can be used to detect proximity. The coil L1 is placed in a position relative to which it is desired to sense whether an object is in the proximity. The coil is connected to two capacitors C1 and C2 connected in series. The voltage V1 across the capacitor C2 is supplied to an active element 302 in the form of a voltage-controlled current source (VCCS). The current i generated by the VCCS is proportional to the voltage V1 with a transconductance constant gm. The oscillator provides an oscillating signal X1 with an oscillator frequency f. The frequency f will depend on the inductance of L1, all other things being equal. When an object moves within a near field of the coil L1, the magnetic flux density caused by a current generated by the VCCS and flowing in the coil will be affected by the magnetic properties of the object and thereby change the inductance of L1. Thus an object can be detected by monitoring the frequency f.

The coil L1 can be placed where it is desired to sense proximity. Preferably, the coil is a solonoide type (with or without a core) e.g. mounted on the back side of a plastics front cover of a mobile telephone. In order to provide a relatively high sensitivity, the coil is mounted such that its longitudinal axis is directed towards a position where an object is expected to be present. That is, in a direction perpendicular or at least inclined relative to the above-mentioned front cover.

In a preferred embodiment the oscillator is designed to provide an oscillator frequency at Radio Frequencies (RF) of about 5–10 MHz. However, the oscillator can be designed to oscillate at even higher frequencies, e.g. 30–50 MHz.

In a preferred embodiment the oscillator is designed to provide an oscillating signal with a relatively low duty cycle; e.g. a duty cycle of about 5–10%. Thereby it is possible to reduce the power consumption; this is expedient in particular when the oscillator is operated by battery power.

It should be noted that the model shown in FIG. 3 represents various types of oscillators e.g. a Colpitts Oscillator or a Hartley Oscillator.

Figure 4:
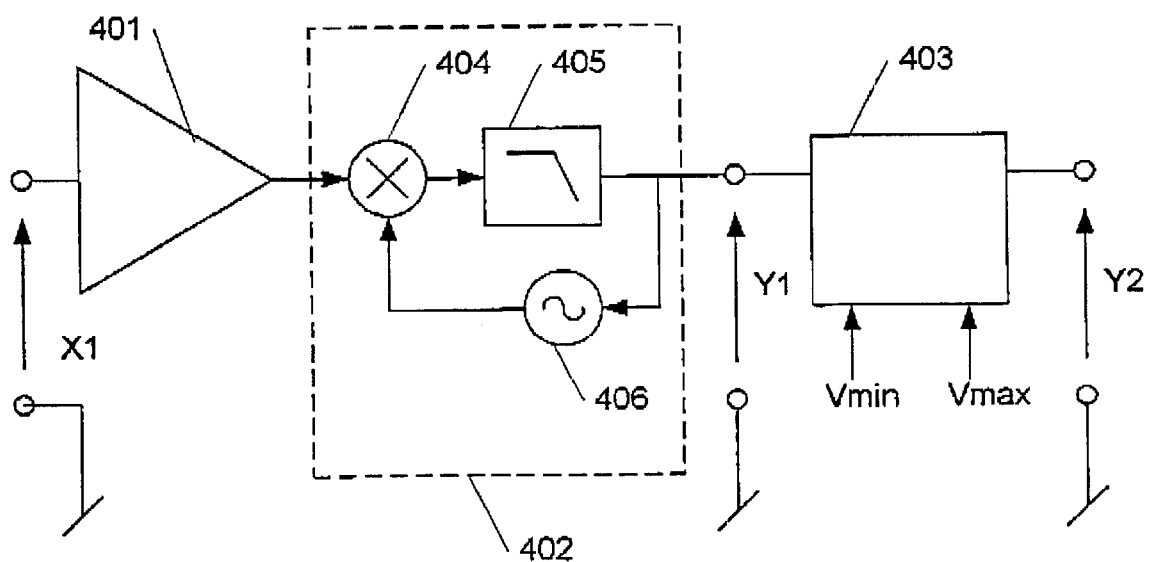
FIG. 4 shows a frequency detector and decision circuit.

FIG. 4 shows a frequency detector and decision circuit. This circuit can be connected to receive the signal X1 provided by the oscillator shown in FIG. 3. A buffer 401 with a relatively high input impedance is used to provide a buffered oscillator signal. The buffered oscillator signal is supplied to a phase-locked loop 402 in order to detect the frequency of the oscillator signal. The phase-locked locked loop 402 provides a signal Y1 with a signal amplitude proportional to the frequency of the oscillator signal. This signal is supplied to a decision circuit 403 in the form of a range detector. When the signal amplitude of the signal Y1 is within minimum and maximum limits determined by Vmin and Vmax, respectively, it is decided that an object is present in the proximity of a coil in the oscillator circuit (e.g. the coil L1). Alternatively, when the signal amplitude of the signal Y1 is outside minimum and maximum limits determined by Vmin and Vmax, respectively, it is decided that an object is not present in the proximity of the coil.

However, it may be convenient to select the opposite decision criteria i.e. when the signal amplitude of the signal Y1 is within minimum and maximum limits determined by Vmin and Vmax, respectively, it is decided that an object is not present in the proximity of the coil; and vice versa.

Preferably, the signal Y2 provided by the decision circuit 403 is a binary control signal representing either proximity or no proximity. In a preferred embodiment the decision circuit 403 is a simple threshold comparator.

The phase-locked loop 402 comprises a phase detector 404 in the form of a multiplier, a low-pass filter 405, and a voltage-controlled oscillator (VCO) 406.

Thus, the inductance of the coil is changed due to the movement of an object in the near field of the coil; this changes the frequency of the oscillator which changes the amplitude of the signal Y1 which, finally, results in a change or modification of the control signal Y2.

Figure 5:
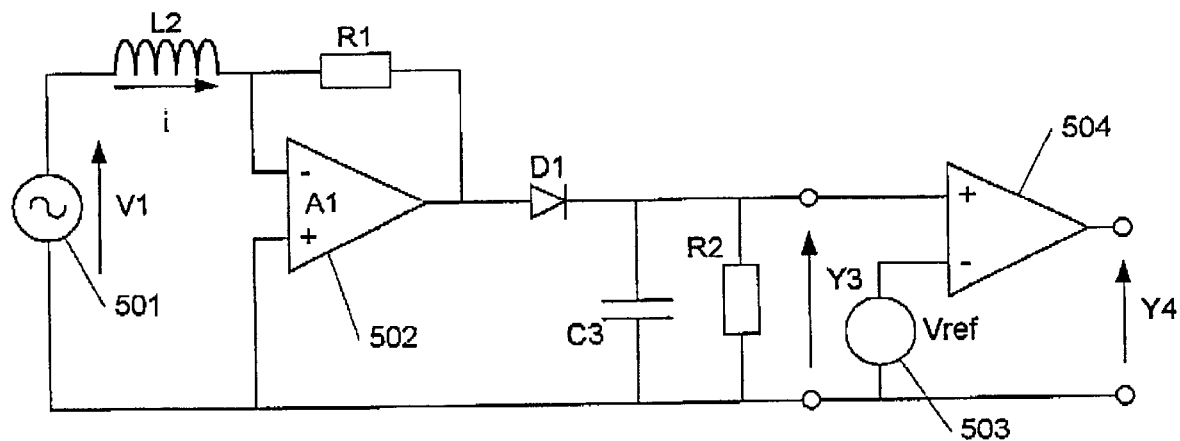
FIG. 5 shows a first impedance detector and a decision circuit.

FIG. 5 shows a first impedance detector and a decision circuit. This embodiment is arranged to detect the change of current i which flows through the coil L2, said change being caused by a change in position of an object in the near field of the coil. A Radio Frequency oscillator 501 provides an oscillating signal V1 supplied to the coil L2. The operational amplifier 502 has a relatively high input impedance; the current i flowing through L2 will therefore also flow through the resistor R1. Thus, the amplifier 502 and the resistor R1 form a transconductance amplifier converting the current i to a voltage output from the transconductance amplifier and supplied to the anode of diode D1. Diode D1 in connection with the capacitor C3 and the resistor R2 form a detection circuit. The detection circuit rectifies the oscillating signal output from the transconductance amplifier and integrates the rectified signal by means of the capacitor C3 and the resistor R2. The amplitude of the signal Y3 is thereby responsive to the inductance of the coil L2.

The comparator 504 is connected to receive the signal Y3 and compare that signal with a reference voltage Vref. The comparator 504 thereby provides a control signal Y4 indicative of whether or not an object is in the proximity of the coil L2. In an alternative embodiment the range detector 403 may replace the comparator 504 and the reference voltage source 503.

Figure 6:
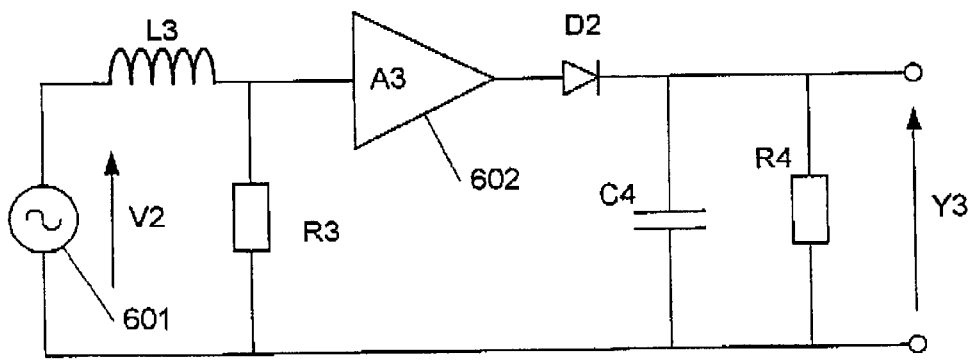
FIG. 6 shows a second impedance detector.

FIG. 6 shows a second impedance detector. This embodiment is also arranged to detect the change of current i which flows through the coil L2, said change being caused by a change in position of an object in the near field of the coil. A Radio Frequency oscillator 601 provides an oscillating signal V2 supplied to a voltage-divider circuit formed by a coil L3 and a resistor R3. The input of the amplifier 602, with voltage gain A3, is connected to a circuit node connecting L3 and R3. A signal output from the amplifier 602 is provided to a detector circuit formed by D2, C4, and R4 working as described above. Thereby a signal Y3 with an amplitude responsive to the inductance of the coil is generated. The signal Y3 can be provided as input to a decision circuit (e.g. a range detector or a threshold comparator).

Figure 7:
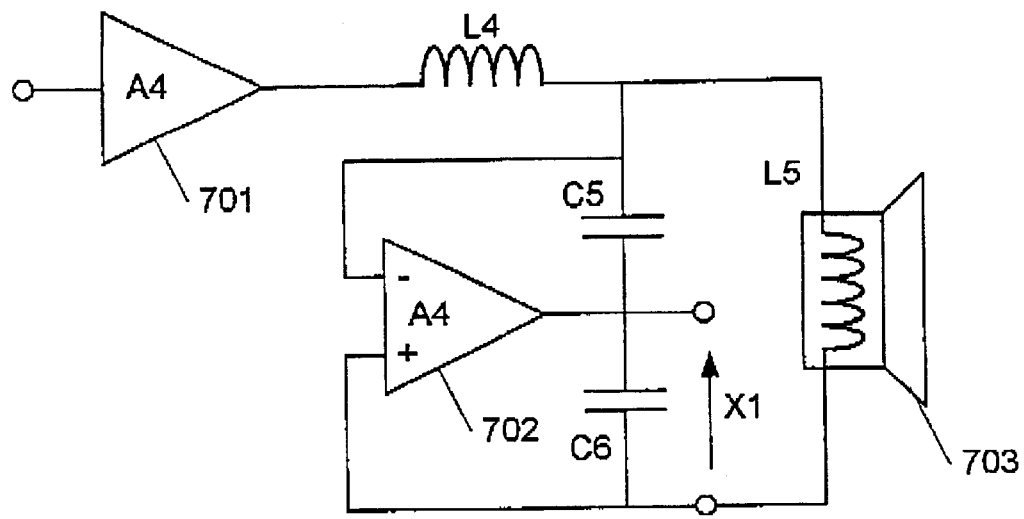
FIG. 7 shows a first combined audio and proximity circuit.

FIG. 7 shows a first combined audio and proximity circuit. An amplifier 701 provides an audio signal supplied to the coil L5 of the loudspeaker 703 via the coil L4. The coil L5 of the loudspeaker 703 is adapted to drive a loudspeaker membrane (not shown) in order to emit sound in response to the audio signal.

The capacitors C5 and C6 are mutually connected in series, while connected in parallel to the loudspeaker coil L5. The operational amplifier 702 is connected to supply a voltage signal X1 on its output, said output being connected to a circuit node between C5 and C6. The inverting and non-inverting input of the operational amplifier 702 is connected to receive the voltage over L5 in parallel with the series connection of C5 and C6. Thereby an oscillator is provided. Preferably, the oscillator is designed to oscillate at a frequency higher than the highest audio frequency in the audio signal; preferably the oscillator is designed to oscillate at a Radio Frequency (RF) of about 5–10 MHz. A typical audio signal has a frequency band substantially within a range of 50 Hz to 3 KHz for speech reproduction, or within 20 Hz to 20 KHz for music reproduction.

The coil L4 is selected sufficiently large to block Radio Frequencies; that is such that the RF oscillator signal is prevented from disturbing the amplifier 701 via its output. The capacitor C5 is selected sufficiently small to prevent the audio signal from disturbing the oscillator.

The oscillating signal X1 can be provided to a frequency detector and decision unit e.g. as shown in FIG. 4.

Thus, by means of the circuit shown in FIG. 7 it is possible to drive a loudspeaker membrane with the coil L5 to produce sound while it is possible to detect whether an object is in the proximity of the same coil L5.

Figure 8:
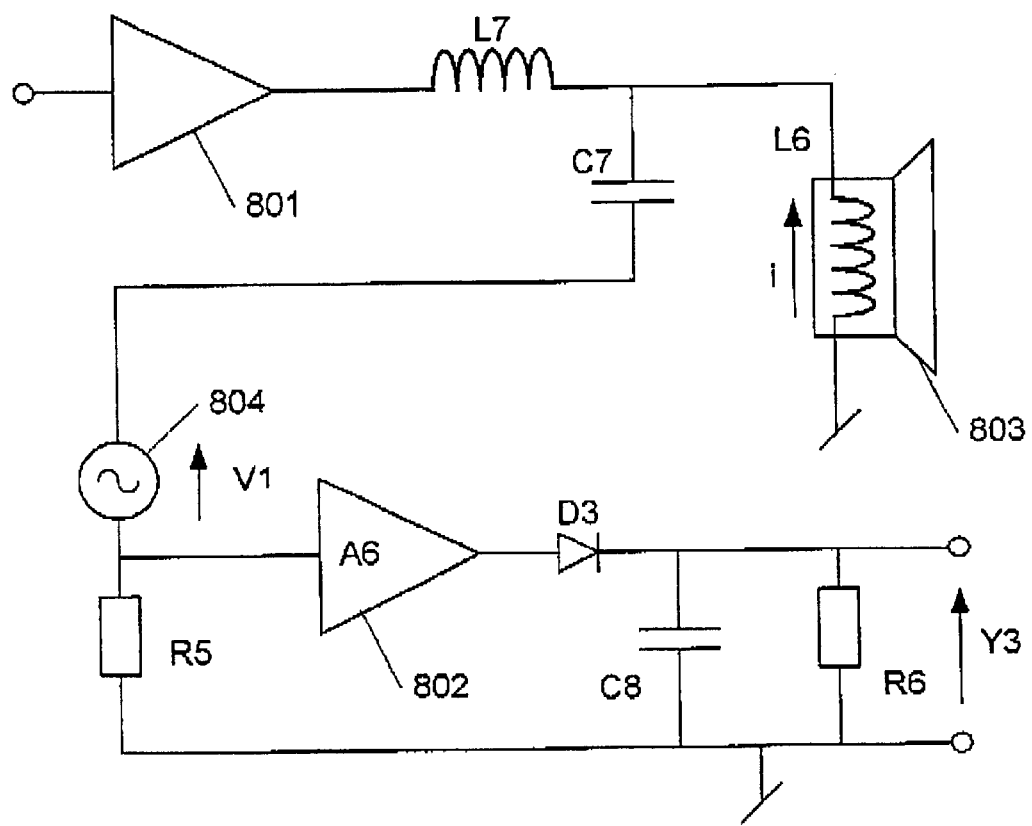
FIG. 8 shows a second combined audio and proximity circuit.

FIG. 8 shows a second combined audio and proximity circuit. This embodiment is arranged to detect the change of current i which flows through the coil L6 of the loudspeaker 803, said change being caused by a change in position of an object in the near field of the coil L6. An amplifier 801 provides an audio signal supplied to the coil L6 of the loudspeaker 803 via the coil L7. The coil L6 of the loudspeaker 803 is adapted to drive a loudspeaker membrane (not shown) in order to emit sound in response to the audio signal.

The Radio Frequency oscillator 804 supplies an oscillating signal V1 to the loudspeaker coil L6 via the capacitor C7. The coil L7 is selected sufficiently large to block Radio Frequencies; that is such that the RF signal is prevented from disturbing the amplifier 801 via its output. The capacitor C7 is selected sufficiently small to block audio frequencies and sufficiently large to conduct the RF signal V1. Thus, when the inductance of the coil L6 changes due to a changed position of an object, if any, within the near field of the coil L6, the current i flowing through the coil changes. The amplifier 802 with voltage gain A6 has a relatively high impedance; therefore the current i flowing through the coil L6 will also flow through the resistor R5. This in turn, results in a voltage, over the resistor R5, responsive to the inductance of the coil L6. This voltage is buffered or amplified by the amplifier 802. An output signal from the amplifier 802 is provided to a detector circuit comprising the rectifying diode D3, and the low-pass filter/integrator formed by the capacitor C8 and the resistor R6. The signal Y3 output from the detector circuit can be supplied to a decision circuit (e.g. a range detector or a threshold comparator as shown in FIGS. 4 or 5, respectively).

Generally speaking, the amplitude and the frequency of the oscillating signal provided to the loudspeaker coil for the purpose of detecting proximity should be selected so as to disturb the reproduction of sound, by means of the loudspeaker, as little as possible. Further, care should be taken so that excessive radio frequency power is not dissipated in the loudspeaker. Alternatively, the loudspeaker should be adapted with cooling means.

Figure 9A:
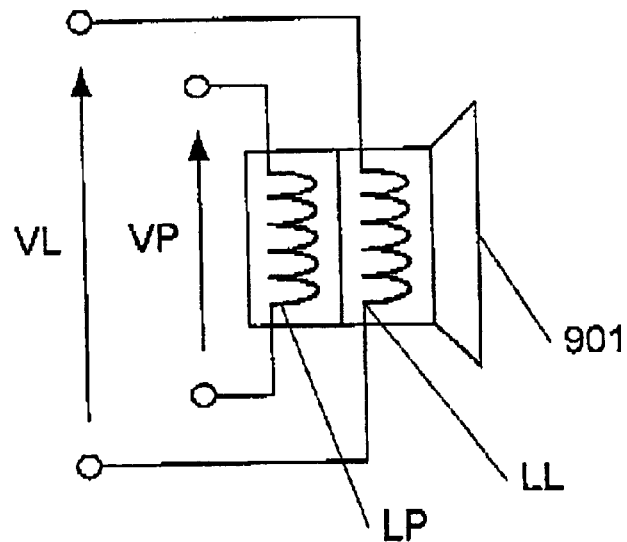
FIG. 9a shows a basic loudspeaker with a loudspeaker coil and a proximity coil.

FIG. 9a shows a basic loudspeaker with a loudspeaker coil and a proximity coil. The loudspeaker 901 comprises a coil LL for driving a loudspeaker membrane (not shown) in response to an audio signal VL. The loudspeaker 901 further comprises a coil LP supplied with an oscillating signal VP.

Figure 9B:
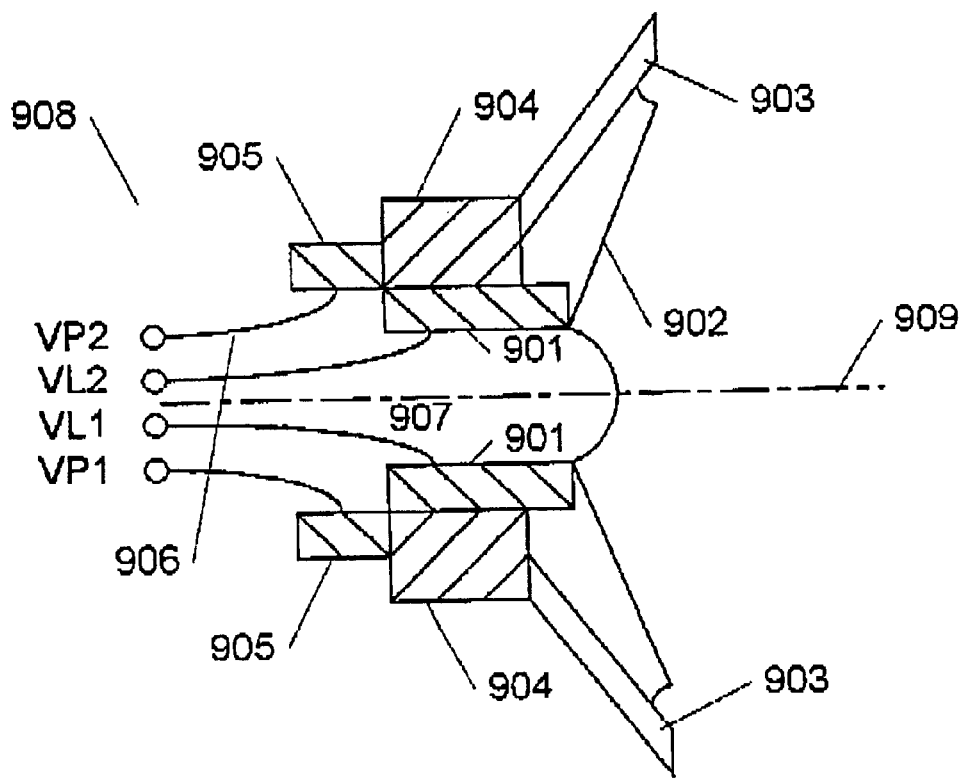
FIG. 9b shows a cross-sectional view through a loudspeaker with a loudspeaker coil and a proximity coil.

FIG. 9b shows a cross-sectional view through a loudspeaker with a loudspeaker coil and a proximity coil. The loudspeaker 908 comprises a magnet 904 to provide static magnetic field, all other things being equal. A coil 901 with an air core is adapted to move along its longitudinal axis within the air core 907 and to move a membrane 902 fixed to the coil in its centre. The membrane 902 is fixed along its circular periphery to a chassis 903 of the loudspeaker. The loudspeaker is driven by a signal provided at the terminals VL1 and VL2 and connected to the coil 902 by means of flexible wires 906.

Moreover, the loudspeaker comprises a coil 905 mounted on the back of the loudspeaker 908. This coil is connected to terminals VP1 and VP2 by means of wires 906. Thus, the coil 905 can be connected electrically to substitute any of the coils L1, L2, or L3 for the purpose of detecting proximity. The coil 905 can be placed in the loudspeaker in various other ways; that is the coil can be wound along the periphery of the chassis 903, on the inside of the coil 902, etc.

The axis 909 indicates a longitudinal axis of the coils 901 and 905.

Further, it should be noted that the voltage levels Vref, Vmin, and/or Vmax can be adjusted by means providing adaptation to an ambient magnetic field. This can be carried out i.a. by placing an additional coil in the device for sensing such an ambient magnetic field.

Although the invention has been described in connection with a mobile telephone, it may be applied in similar devices such as other communications devices, laptop computers, portable music playing devices, etc., where the detection of the proximity of an object relative to the device is of interest for the control of certain functions of the device, such as on/off-, standby/on-switching, control of display illumination, volume control of a loudspeaker, etc.

What is claimed is:

1. An electronic device having a proximity sensor, comprising:
    a loudspeaker (11; 703; 803) for receiving an audio signal and having a loudspeaker coil (13; L5; L6) with an impedance;
    a proximity sensor adapted to provide a control signal (Y2; Y3) indicative of whether an object (8) is in proximity of the device (1);
    characterized by having
        oscillation means (C5, C6, 702; 804) coupled to the loudspeaker coil (13; L5; L6) to provide the control signal (Y2; Y3) in response to the impedance.

2. An electronic device according to claim 1, characterized in that the oscillation means (C5, C6, 702; 804) has an oscillation frequency (f) which is dependent on the inductance of the loudspeaker coil (13; L5; L6).

3. An electronic device according to claim 1, characterized in that the oscillation means (C5, C6, 702; 804) is adapted to provide an oscillating signal with a substantially fixed frequency to the loudspeaker (11; 703; 803).

4. An electronic device according to claim 1, characterized in that the oscillation means comprises a phase-shift oscillator type (C5, C6, 702).

5. An electronic device according to claim 1, characterized in that the oscillation means (C5, C6, 702; 804) has an oscillation frequency oscillating at a frequency above a frequency band of the audio signal.

6. An electronic device according to claim 1, characterized in that the device comprises a front cover (6) made of a material allowing passage of magnetic lines of flux generated by the loudspeaker coil (13; L5; L6).

7. An electronic device according to claim 1, characterized in that the loudspeaker coil (13; L5; L6) comprises a longitudinal axis (909), and that the coil is mounted such that the longitudinal axis of the coil is inclined relative to the face of a front cover (6).

8. An electronic device according to claim 1, characterized in that the electronic device is a mobile telephone (1).

9. An electronic communications device, having a proximity sensor comprising:
   communication means,
   a proximity sensor adapted to provide a control signal indicative of whether an object is in the proximity of the device,
   a proximity sensor coil with an impedance, and oscillation means coupled to the proximity sensor coil to provide the control signal in response to the impedance,
   a loudspeaker having a loudspeaker coil, wherein the proximity sensor coil is integrated in the loudspeaker, wherein the oscillation means is adapted to provide a substantially fixed oscillating signal to the proximity sensor coil.

10. An electronic device according to claim 9, wherein the oscillation means comprises a phase-shift oscillator.

11. An electronic device according to claim 9, wherein the proximity sensor coil is a solenoid.

12. An electronic device according to claim 9, wherein the proximity sensor coil comprises a longitudinal axis, and wherein the proximity sensor coil is mounted such that the longitudinal axis of the proximity sensor coil is inclined relative to the face of a front cover.

13. An electronic device according to claim 9, wherein the electronic device is a mobile telephone.

14. A method of detecting proximity of an object relative to a loudspeaker with a loudspeaker coil which has an impedance, comprising the steps of:
   supplying an audio signal to the loudspeaker coil,
   supplying a radio frequency signal to the loudspeaker coil, and
   providing a control signal responsive to a change in the impedance and indicative of whether an object is present in proximity of the device.

15. A method according to claim 14, wherein the method further comprises the step of: detecting a change in frequency in an oscillator connected to the loudspeaker coil; said frequency being responsive to the impedance of the loudspeaker coil.

16. A method according to claim 14, wherein the method further comprises the step of: detecting a change in current flowing through the loudspeaker coil; said current being responsive to the impedance of the loudspeaker coil.

17. An electronic device having a proximity sensor comprising:
   communication means,
   a proximity sensor adapted to provide a control signal indicative of whether an object is in the proximity of the device,
   a proximity sensor coil with an impedance, and oscillation means coupled to the proximity sensor coil to provide the control signal in response to the impedance,
   a loudspeaker having a loudspeaker coil, wherein the proximity sensor coil is integrated in the loudspeaker, wherein the device comprises a front cover made of a material allowing passage of magnetic lines of flux generated by the proximity sensor coil.

* * * * *